United States Patent [19]

Crucius et al.

[11] 4,363,069

[45] Dec. 7, 1982

[54] OVERVOLTAGE ARRESTER WITH ARRESTER ELEMENTS IN A FRAME COMPRISING COLUMNS

[75] Inventors: Michael Crucius; Mohamed A. Hassan, both of Berlin, Fed. Rep. of Germany

[73] Assignee: Siemens Aktiengesellschaft, Munich, Fed. Rep. of Germany

[21] Appl. No.: 248,232

[22] Filed: Mar. 27, 1981

[30] Foreign Application Priority Data

Mar. 28, 1980 [DE] Fed. Rep. of Germany ....... 3012744

[51] Int. Cl.[3] .............................................. H02H 9/06

[52] U.S. Cl. .................................... 361/130; 361/120; 361/117; 315/36

[58] Field of Search ............... 361/130, 128, 117, 120, 361/126, 127, 129, 131; 315/36; 313/231.1, 325

[56] References Cited

U.S. PATENT DOCUMENTS

| | | | |
|---|---|---|---|
| 2,528,127 | 10/1950 | Ferguson | 361/130 |
| 2,542,805 | 2/1951 | Fink | 361/128 |
| 2,608,600 | 8/1952 | Vörts et al. | 361/130 X |
| 3,155,874 | 11/1964 | Sorrow et al. | 361/128 X |

FOREIGN PATENT DOCUMENTS

| | | | |
|---|---|---|---|
| 538533 | 3/1957 | Canada | 361/128 |
| 304299 | 3/1955 | Switzerland . | |

*Primary Examiner*—Patrick R. Salce
*Attorney, Agent, or Firm*—Kenyon & Kenyon

[57] ABSTRACT

Disclosed are overvoltage arresters comprising a columnar arrangement of arrester elements, insulating elements and conducting elements. The elements are arranged to provide a current flow in at least one plane extending transversely to the columns. The conducting frame elements connect other elements thereto which elements extend both axially and transversely of the columns. For an arrester including n conducting frame members per plane, n-1 arrester elements are arranged per plane of the columnar structure. The current connection between adjacent plane is made by an arrester element or by a conducting member preferably such that opposite current flows are obtained in adjacent planes. Overvoltage arresters according to the invention are particularly suited for using voltage-dependent resistors of the zinc oxide type alone or in conjunction with spark gaps. The columnar structure may be disposed in a customary insulating gas such as nitrogen or in a gas with particularly high insulating strength such as $SF_6$.

13 Claims, 7 Drawing Figures

OVERVOLTAGE ARRESTER WITH ARRESTER ELEMENTS IN A FRAME COMPRISING COLUMNS

BACKGROUND OF THE INVENTION

The present invention relates to an overvoltage arrester of the type comprising a frame including a plurality of parallel columns, with some of the arrester elements being arranged in planes extending transversely to the longitudinal extent of the columns.

Disclosed in Swiss Pat. No. 304,299 is an overvoltage arrester comprising a frame which includes a plurality of columns, arrester elements and insulating elements, with some of arrester elements arranged in planes perpendicular to the longitudinal axes of the columns. Three columns are shown and the arrester elements are arranged alternatingly along the axis of one of the columns and then in a plane extending perpendicularly to the longitudinal axis of the columns and connecting two columns, and then again along the axis of another column. This results in an overall helical arrangement which shortens the overall axial length otherwise required for a given arrester. The arrester elements and insulating elements are of uniform dimensions.

OBJECTS AND SUMMARY OF THE INVENTION

It is an object of the present invention to provide an overvoltage arrester having a substantially increased packing density of arrester elements.

It is another object of the present invention to provide an improved high voltage, e.g., 500 Kv, overvoltage arrester.

It is also an object of the present invention to provide an improved overvoltage arrester including overpressure relief means.

It is a further object of the present invention to provide an improved overvoltage arrester which can be inserted without difficulty into metal-encapsulated, pressure gas-insulated switching installations, which can be installed in unpressurized air or nitrogen, and which is suitable for outdoor use.

These and other objects of the invention are achieved in an overvoltage arrester of the type including a frame comprising a plurality of spaced substantially parallel columns, a plurality of arrester elements and a plurality of insulating elements with at least one of the arrester elements extending in a plane transverse to the longitudinal extent of the columns, in which the invention provides conducting frame elements having means for the connecting other elements thereto which elements extend both axially and transversely with respect to the columns, there being one more conducting frame elements per plane than the number of arrester elements per plane. In other words, for n conducting frame elements per plane, $n-1$ arrester elements are provided per plane.

For example, according to the invention, three arrester elements can be accommodated in each plane of a four column structure, four conducting frame elements being provided per plane.

The arrester elements and the insulating elements are arranged to provide a current flow through the arrester in directions both axially and transversely of the columns. The current flow transversely of the columns is through arrester elements disposed in the at least one plane extending transversely of the columns. Current enters a respective plane (current input) through an arrester element and leaves that plane (current output) through an arrester element.

The arrester elements and the insulating elements in one embodiment have equal outside dimensions.

According to one embodiment of the invention, the arresters of adjacent planes can be connected through another arrester element. The overvoltage arrester obtained thereby is suitable for installation in air or in nitrogen.

According to another embodiment of the invention, arrester elements of adjacent planes can be connected through a conducting support element which can have a shorter axial length than that of the arrester elements. Thereby, the mutual spacing of the planes can be reduced and the overvoltage arrester can be substantially more compact. The overvoltage arrester according to this aspect is particularly suited for installation in electronegative gas under pressure, e.g., $SF_6$, and permits arresters to be constructed with dimensions suitable for installation in metal-encapsulated switching installations.

Both embodiments described above can be realized in a serial current flow arrangement through the arrester elements of a plane in which all of the arrester elements in a plane are connected in series, or in a modified serial current flow arrangement in which arrester element sets or groups comprising two or more elements are connected in parallel, with the individual sets of arrester elements of a plane being connected in series.

According to one aspect of the invention, the location of the arrester element or conducting frame element connecting the adjacent planes of arrester elements can be changed from plane to plane so that the directions of flow of current change from plane to plane. In a disclsoed embodiment, the current flow is in opposite directions in adjacent planes. This arrangement provides the advantage of reducing the overall inductance of the overvoltage arrester.

Connection of the arrester elements in planes extending transversely of the columns by conducting elements according to the invention permits, in accordance with an aspect of the invention, connection of control elements, such as linear or non-linear control resistors, capacitors, etc., freely and as required. In accordance with this aspect of the invention, in addition to the $n-1$ arrester elements per plane, a control element can be arranged in each plane of arrester elements, the control element being connected between the current input and the current output of each plane. In this manner, a chain of control elements connected in planes of arrester elements supplements the triangular, rectangular or other polygonal structure of the planes to increase the structure's mechanical strength. However, if it is only desired to increase the strength of the structure, an insulating element having the dimensions of an arrester element can be connected in each plane instead of a control element and in addition to the $n-1$ arrester elements.

According to another aspect of the invention, the connecting frame elements can be provided as hollow bodies. In one embodiment, the hollow body includes a cup-shaped main part defining a cavity, and a cover which provides access to the cavity of the body. Such a hollow body can be constructed to permit a building-block-like assembly of the overvoltage arrester, and the attachment thereto of fastening elements, if desired. In addition, the cavity of the conducting frame element can be used as a collecting space for gases which can be produced by the thermal decomposition of arrester elements should the overvoltage arrester be overloaded. Further in accordance with this aspect of the invention, interior spaces of the arrester elements are in communication with the cavities of the hollow conducting frame elements with the cavities of the conducting frame elements being in communication with the atmosphere through a pressure-equalizing opening. Further, according to this aspect of the invention, the overvoltage arrester is particularly suited for use in a housing which is to be protected from sudden pressure stress in the event of overload of the arrester, as the hot gases can stress the housing only after the cavities of the frame elements have been filled, thereby the gas pressure which reaches the housing is attenuated and time delayed.

According to another aspect of the invention, in overvoltage arresters including a housing, the cavities of the hollow conducting frame elements can be communicated with the atmosphere surrounding the housing by means of one or more burst diaphragms in the housing should excessive overpressure occur. In such a case, pressure stress on the housing as well as contamination of the housing interior by any gases released by the arrester elements can be eliminated. The housing can thereby be used again after damaged components are replaced.

According to one embodiment of the invention, hollow preferably, tubular support elements can be disposed between the arrester elements and the hollow conducting frame elements.

These and other objects, aspects, features and advantages of the invention will be more apparent from the following description of the preferred embodiments thereof when considered with the accompany drawings and appended claims.

BRIEF DESCRIPTION OF THE DRAWINGS

The present invention is illustrated by way of example and not limitation in the figures of the accompanying drawings in which like references indicate similar parts and in which.

DESCRIPTION OF THE PREFERRED EMBODIMENT

Figure 1:
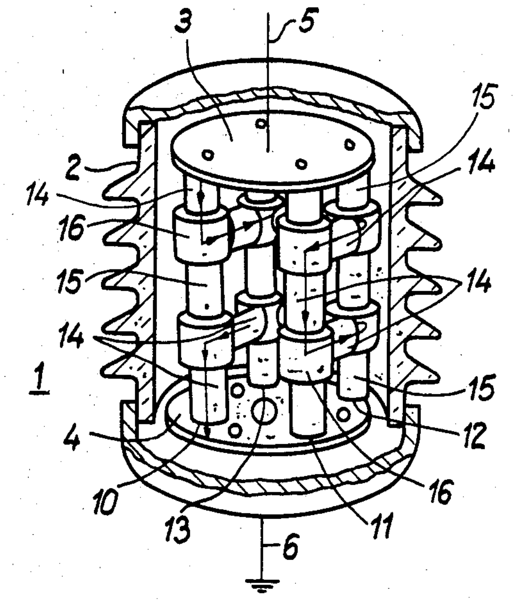
FIG. 1 is a perspective view partly in section of an overvoltage arrester according to one embodiment of the invention suitable for outdoor installation.

Referring now to the drawings, the overvoltage arrester 1 shown in FIG. 1 comprises a housing 2 in the form of a hollow procelain insulator with skirts. In the interior of the housing, a frame assembly of arrester elements comprising four columns 10–13 disposed at corners of square a is arranged between support plates 3 and 4 which are respectively connected to a lead 5 on the voltage side and a ground lead 6. Each of the columns 10, 11, 12, 13 is composed of arrester elements 14, insulating support elements 15 and conducting frame elements 16 interconnected in a predetermined arrangement. The arrester elements 14 and the insulating support elements 15 have the same outside dimensions so that these two elements can be connected in any desired manner.

The arrester, insulating and conducting frame elements in the overvoltage arrester 1 shown in FIG. 1 are sequentially arranged as follows. An arrester element 14 is connected to the plate 3 to which voltage lead 5 is connected, and is disposed in line with the column 10. Also connected to the plate 3 and disposed in line with columns 11, 12 and 13 are insulating support elements 15. In a first plane below plate 3 extending perpendicularly to the longitudinal axis of the columns are disposed in a U-shaped arrangement, three further arrester elements 14 interconnected by conducting frame elements 16 in a current conducting and mechanically supporting manner. The open side of the U extends between columns 10 and 11. In line with column 11, the current connection to the arrester elements of a next lower plane is made by an arrester element 14 via a conducting frame element 16. In the next lower plane of arrester elements, the current path runs through three further arrester elements 14 in the opposite direction to the flow of current in the upper plane of arrester elements. Another arrester element 14 arranged in line with column 10 is electrically connected to the lower support plate 4, to which the ground lead 6 is connected. The remaining elements constituting the columns are insulating support elements 15 which have the same outside dimensions as the arrester elements 14 and are disposed in line with a respective column.

The arrangement of elements in the embodiment of FIG. 1 provides a series current flow from plate 3 to upper arrester element 14, to the upper plane of arrester elements, to the intermediate arrester element 14, between the two planes of arrester elements, to the lower plane of arrester elements, to the lower arrester element 14, and to plate 4.

The arrester elements 14 are preferably voltage-dependent resistors of the zinc oxide type. The resistance element proper is surrounded by an insulating casing which fits into the conducting frame elements. The separate insulated housing can be dispensed with, however, since the zinc oxide resistors have high mechanical strength. Alternately, the resistor elements can be connected directly to the frame elements with suitable connection fittings which are firmly attached to the body of the resistor element. Elimination of the insulating housing increases the volume of resistance material that can be accommodated and improves the cooling of the resistor elements.

A series circuit including spark gaps and voltage-dependent resistors can also be provided, if desired. Such a circuit can be obtained, for example, if one or several of the arrester elements 14 in FIG. 1 are provided as spark gap units. The spark gaps do not require a gas-tight encapsulation thereof if the structure shown in FIG. 1 is arranged inside the housing 2 in an atmosphere which provides a desired operation of the spark gaps. For example, the housing 2 can be filled with nitrogen to accomplish this.

Figure 2:
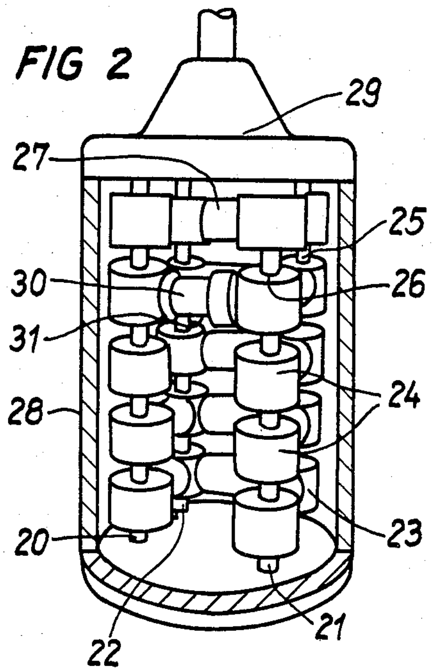
FIG. 2 is a perspective view partly in section of an overvoltage arrester according to another embodiment of the invention suitable for use in a pressurized-gas-insulated metal-encapsulated switching installation.

Another embodiment of an overvoltage arrester according to the invention is shown in FIG. 2. As in FIG. 1, a columnar structure of four columns 20, 21, 22 and 23 disposed at the corners of a square is provided. As described in connection with FIG. 1, an arrester structure having a number of planes of arrester elements perpendicular to the longitudinal axes of the columns can be achieved by an arrangement of conducting frame elements 24, insulating support elements 25, conducting support elements 26 and arrester elements 27. The embodiment of FIG. 2, however, differs from that of FIG. 1 in that arrester elements are not disposed in line with, i.e., in the longitudinal direction of, the columns for connecting the arrester elements of adjacent planes. Instead, alternatingly from plane to plane, insulating support elements 25 and conducting support elements 26 are used to connect arrester elements of adjacent planes. The insulating support elements 25 and the conducting support elements 26 are smaller than the corresponding insulating and arrester elements of the embodiment of FIG. 1. As a result, the distance between planes of arrester elements can be reduced and made substantially smaller, thereby allowing a higher packing density of the arrester elements. The embodiment of FIG. 2 is therefore particularly suited for installation in a gas with a high insulating strength, e.g., sulfurhexafluoride ($SF_6$), which is used in pressurized, gas-insulated, metal-encapsulated switching installations. A metal housing 28, into which the voltage lead is brought by means of a disc feedthrough 29, is provided for the pressurized insulating gas. The arrester elements can comprise voltage-dependent resistors.

In the overvoltage arrester of FIG. 2, a spark gap unit 30 can be inserted in the second plane of arrester elements from the top as an arrester element in addition to the voltage-dependent resistive arrester elements 27. The spark gap unit 30 is encapsulated in an insulating housing 31. Thereby, a different gas from the insulating gas contained in the housing 28 of the overvoltage arrester can be used in the vicinity of the electrodes of the spark gap unit, so as to achieve the desired response and quenching behavior of the spark gap. The spark gap unit 30 shunted across the three of the arrester elements 27 of the second plane, can short the current carried in that plane.

In both the embodiments of FIGS. 1 and 2 described above, four parallel columns are provided which stand in the corners of a square. A smaller number of columns, e.g. three or a larger number, e.g. five, six or more, can, of course, be provided. Regardless of the number of columns chosen, a mechanically strong structure, which requires no additional stiffening, is obtained by the direct connection of frame, arrester, insulating and support elements.

Figure 3:
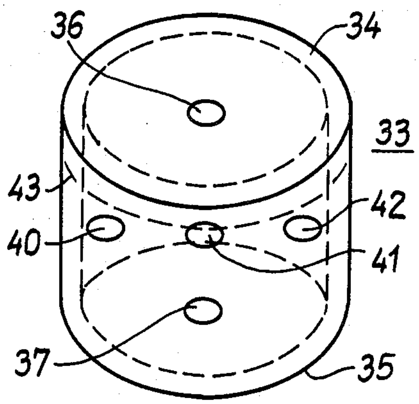
FIG. 3 is a perspective view of a conducting frame element according to one embodiment of the invention.

An embodiment of a frame element is shown in FIG. 3. The frame element 33 has a cylindrical body and an upper and lower cover surface 34 and 35, respectively, each with a tapped hole 35, 37. Along the circumference of the cylindrical body, three tapped holes 40, 41 and 42 are arranged separated by angles of 90°. This arrangement of the tapped holes allows the frame element 33 to be used at any point of the overvoltage arresters shown in FIGS. 1 and 2. If the arrester elements as well as the insulating elements and the insulating and conducting support elements are provided with threaded fitting stems, the overvoltage arresters can be assembled in building-block fashion. Instead of tapped holes, prefitted holes or simple through holes can be provided if the frame elements are designed as hollow bodies and the interior is accessible for attaching a fastening element, for example, pins, nuts or the like. To this end, the frame element may be of two-part design by parting it along a line 43, shown dashed in FIG. 3, in the manner of cup or pot and a lid.

In the embodiments of FIGS. 1 and 2, arrester elements are arranged connected in series in respective planes disposed perpendicular to the longitudinal extent of the columns. However, if additional current carrying capacity is desired, arrester elements can be connected in parallel to form the current flow through a particular plane as shown schematically in FIG. 4. The arrester elements 45 are designated by lines in FIG. 4 for arrangements generally as described above having four columns. For each leg of the U in the plane, a pair of arrester elements are connected in shunt by means of conducting connections 46. Each pair is connected in series with an adjacent pair. Each such plane of arrester elements can therefore contain six instead of three arrester elements. If a further increase of the arrester current capacity or the energy to be absorbed is desired, more than two arrester elements in a plane can be connected in parallel. The parallel arrangement of FIG. 4 with regard to the arrangement of frame, insulating and conducting and insulating support elements between the planes is otherwise generally as described above in connection with FIGS. 1–3.

Figure 4:
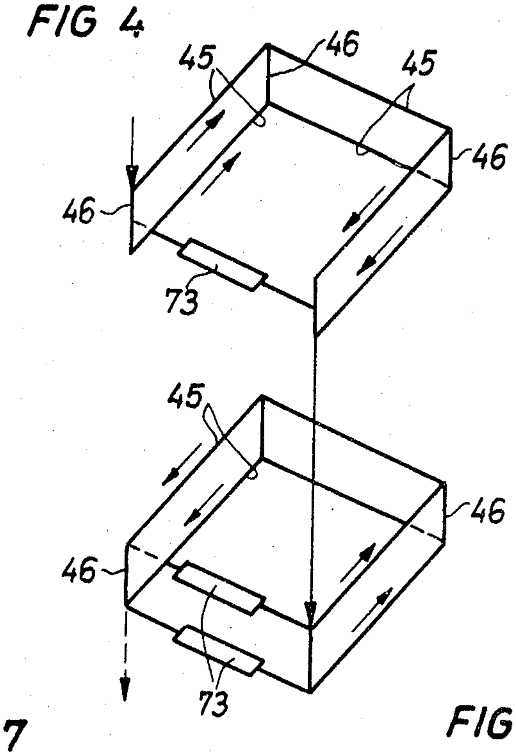
FIG. 4 is a schematic diagram illustrating a parallel circuit arrangement of arrester elements in accordance with one embodiment of the invention.

Still referring to FIG. 4, a control element 73, for example a linear or non-linear resistor or a capacitor, can be inserted between the current input and output of each plane of arrester elements. Element 73 in conjunction with similar control elements connected in other planes, forms a chain of control elements which is shunted across the arrester elements 45 and equalizes the voltage distribution. The control elements can be connected in parallel for the respective leg of a polygonal arrangement in the same manner described above for the parallel connection of arrester elements. A parallel connection of control elements is shown in the lower plane of FIG. 4. However, it is also possible to use a single control element in a parallel connection of arrester elements as shown in the upper plane of FIG. 4.

The arrangement of overvoltage arresters described above is not limited to arresters disposed in a housing (2 in FIG. 1, 28 in FIG. 2). The columnar structure itself can be provided without a housing as the overvoltage arrester, since the arrangement described above is mechanically strong and stable. However, for outdoor installation, it is necessary that the components be weatherproof.

Overvoltage arresters encapsulated within an insulating housing as well as within a metal housing generally require a presure relief which discharges hot gases under pressure into the outside atmosphere if the arrester is overloaded. The columnar structure described above advantageously enables the integration of a pressure relief system into the arrester.

It is also desirable for arresters installed without a housing or encapsulation to orderly discharge gases which are generated during an overload. According to another aspect of the invention, the interior spaces of active parts of the arrester also can be used as collecting spaces and can be provided at a desired point with an opening leading to the atmosphere.

Figure 5:
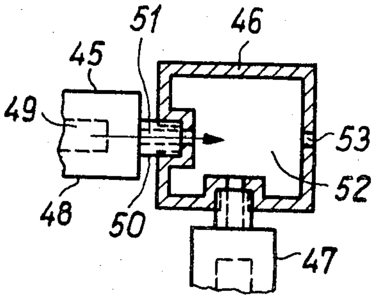
FIGS. 5 and 6 are cross-sectional views showing a portion of a columnar assembly of arrester elements according to embodiments of the invention in which the conducting frame elements connected to arrester elements are hollow and have a cavity therein suitable for receiving gases.
Figure 6:
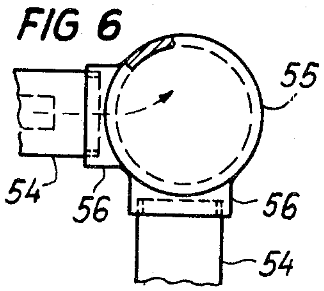

Accoding to one embodiment, the interior of the conducting frame elements can be used as collecting spaces for decomposition gases, generated during overloading, for example, as shown in FIGS. 5 and 6.

FIG. 5 shows a portion of an arrester of the type described in connection with FIG. 1 or FIG. 2 with arrester elements 45, frame elements 46 and support elements 47. The arrester element 45 contains within an insulating housing 48 a resistor body 49 which is connected in a conducting manner to the frame element 46 by means of a threaded post 50. By screwing the threaded post 50 into the frame element 46, a seal against the environment is obtained as well as an electrical connection and a mechanical joint. The gases generated in the event of an overload of the resistor body 49 can be conducted through a hole 51 of the threaded post 50 into a hollow space 52 of the conducting frame element 46, from where they can flow through the adjoining tubular support member 47 to further elements. A small opening 53 is provided in the frame element 46 to enable the pressure to be gradually reduced. Corresponding further openings can also be provided in other frame elements, not shown. The overpressure can stress the housing, but only gradually due to the collecting and venting system provided by the frame elements. To allow gases to escape from the housing and prevent stressing of the housing, a burst diaphragm can be provided at a suitable point in the housing as will be described more fully below.

In the embodiment of FIG. 6, in which the view is rotated 90° to that of FIG. 5, a further junction point is provided within the columnar assembly in which two arrester elements 54 are directly connected by a conducting frame element 55 without threaded posts. To accommodate such a connection, cylindrical extensions 56, which receive the ends of the arrester elements 54 in a sleeve-like manner, are formed on the frame element 55. The joint can be made for example by an external thread on the housing of the arrester elements and an internal thread on the extensions 56. Alternatively, cement or an adhesive is also suitable for forming a durable joint. In any case, provision is made for a transition between the arrester elements and the frame elements which is gas conducting. Compared to the embodiment of FIG. 5, larger cross sections can be obtained with the embodiment of FIG. 6 for the transfer of gases from the arrester elements to the frame elements.

Figure 7:
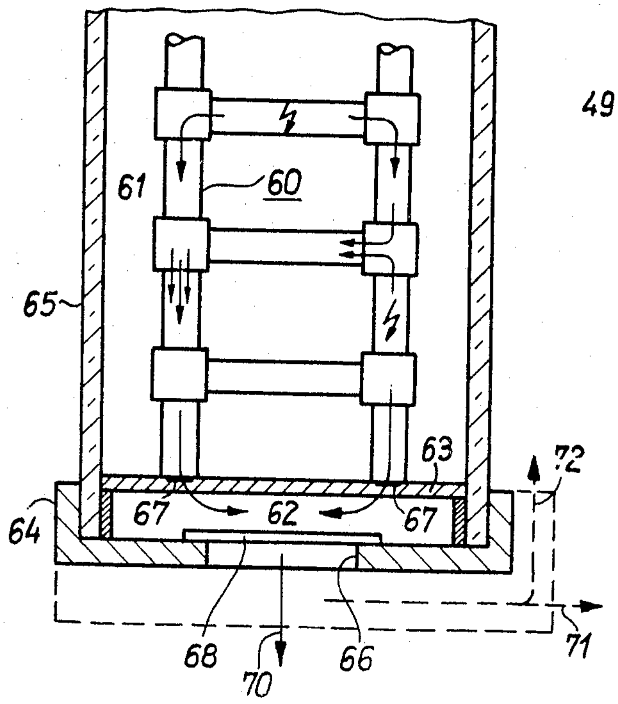
FIG. 7 is a cross section view through an encapsulated overvoltage arrester having burst diaphragms according to one embodiment of the invention.

While in the embodiments of FIGS. 5 and 6, the cavities of the frame elements of the columnar structure serve as collecting spaces for the decomposition gases, from which they flow out gradually through the pressure equalizing openings, FIG. 7 shows an arrangement for discharging gases from an encapsulated arrester of the insulating as well as the metal-encapsulated type without stressing the housing or the encapsulation in any way. For this purpose, the columnar structure, designated by 60, is closed to the interior 61, i.e., no pressure equalizing openings are provided in the frame elements. The hollow interior of the support and frame elements of the columnar structure lead, through burst diaphragms 67, into a buffer space 62 which is formed by a lower support plate 63 for the columnar structure 60 and the terminating fitting 64 of a housing 65. An opening 66 of the terminating fitting 64 is closed off by a further burst diaphragm 68. Gases enter the buffer space 62 after a burst diaphragm 67 has been ruptured, and upon rupturing of the burst diaphragm 68, the gases are allowed to escape into the environment directly without stressing the housing 65. The housing therefore remains in a clean and unstressed condition and can be used over again after defective parts have been replaced.

The dashed lines in FIG. 7 further indicate that the gases can leave the housing 65 not only axially in the direction of the arrow 70, but also radially (or perpendicularly) to the longitudinal axis of the housing 65 in the direction of the arrow 71 or, through deflection, in the direction of the arrow 72 with a suitably chosen terminating fitting 64.

The overvoltage arresters described above can utilize not only the zinc oxide resistors described above which are characterized by a particularly pronounced non-linear current-voltage characteristic, but also with other resistors suitable for overvoltage arresters alone or in conjunction with series- or parallel-connected spark gaps. Therefore, resistors of the silicon carbide type, for example, can also be used as well as combinations of different kinds of resistors or mixed bodies of different resistance materials.

Arrester elements comprising resistors and/or capacitors can also be inserted into the column-like structure to control the voltage distribution. Control rings can be used also for that purpose, alone or in addition to other control elements, particularly in the arrangement of the arresters described above without a housing.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention herein chosen for the purposes of the disclosure without departing from the spirit and scope of the invention.

What is claimed is:

1. An overvoltage arrester comprising a plurality of arrester elements, a plurality of insulating elements and a plurality of conducting elements arranged to form a plurality of columns interconnected by arrester elements, each column comprising at least two spaced conducting frame elements and at least one additional element axially interposed between two conducting frame elements of the column, selected adjacent columns being interconnected by an arrester element which is interposed between respective conducting frame elements of the selected adjacent columns and which lies in a plane extending at about a right angle between adjacent columns, each said conducting frame element including means for connecting a said additional element thereto axially of a respective column and an arrester element thereto which is disposed in a respective said plane, there being a plurality of arrester elements per plane and one more conducting frame element per plane than the number of arrester elements per plane, each said additional element being one of an arrester element, an insulating element and a conducting support element, said insulating elements, conducting elements, and arrester elements being interconnected to provide a current path from an input to an output of said overvoltage arrester through said arrester elements.

2. The overvoltage arrester according to claim 1 wherein additional elements of respective columns are arrester elements and insulating elements disposed to provide a current flow from a conducting frame element of a column to an arrester interposed between that column and an adjacent column.

3. The overvoltage arrester according to claim 1 wherein additional elements of respective columns are insulating elements and conducting support elements disposed to provide a current flow from a conducting frame element of a column to an arrester element interposed between that column and an adjacent column.

4. The overvoltage arrester of claim 1, or 2 wherein the arrester elements and insulating elements have uniform outside dimensions.

5. The overvoltage arrester of claim 1, or 3 wherein the conducting support elements have a shorter axial length than that of the arrester elements.

6. The overvoltage arrester according to claim 1, wherein the elements are interconnected in a self-standing framework.

7. The overvoltage arrester of claim 6 and including a number of arrester elements sufficient to provide an overvoltage arrester having arrester elements extending in at least two of said planes which extend at about a right angle between adjacent columns and are parallel to each other, the conducting elements, insulating elements and the arrester elements being arranged such that opposite current flows are obtained in adjacent planes.

8. The overvoltage arrester of claim 6 wherein the arrester elements of at least one of said planes are interconnected to have a current input and a current output and including a control element connected in said plane between the current input and the current output.

9. The overvoltage arrester of claim 1, 3 or 6 wherein each conducting frame element comprises a hollow body.

10. The overvoltage arrester of claim 9 wherein each arrester element includes an interior space which is in communication with the hollow space of the conducting frame element to which it is connected.

11. The overvoltage arrester of claim 10 wherein each conducting frame element includes a pressure equalizing opening therein in communication with the interior of the hollow body and with the atmosphere.

12. The overvoltage arrester of claim 10 and including a housing in which said overvoltage arrester is disposed, the housing including a burst diaphragm in communication with the hollow spaces of the arrester elements and the interior of the hollow bodies of the conducting frame elements, the diaphragm being adapted to communicate the interior spaces and the interior of the hollow bodies with the atmosphere in the event of excessive overpressure therein.

13. The overvoltage arrester of claim 12, wherein the housing includes a buffer space in communication with the hollow spaces of the arrester elements and the interior of the hollow bodies, a further burst diaphragm being interposed between said buffer space and said burst diaphragm.

* * * * *